United States Patent [19]

Klinner

[11] Patent Number: 4,798,529

[45] Date of Patent: Jan. 17, 1989

[54] APPARATUS AND METHOD FOR BRIQUETTING FIBROUS CROP OR LIKE MATERIALS

[75] Inventor: Wilfred E. Klinner, Milton Keynes, England

[73] Assignee: National Research Development Corporation, London, England

[21] Appl. No.: 849,942

[22] Filed: Apr. 9, 1986

[30] Foreign Application Priority Data

Apr. 9, 1985 [GB] United Kingdom ................. 8509061

[51] Int. Cl.⁴ ............................................. B29C 43/08

[52] U.S. Cl. ................................ 425/289; 100/155 R; 100/156; 100/157; 100/168; 100/176; 425/237; 425/362; 425/409; 425/DIG. 230

[58] Field of Search ............. 425/DIG. 230, 230, 237, 425/352, 355, 406, 408, 289, 362, 409; 100/297, 907, 155, 156, 157, 168, 176

[56] References Cited

U.S. PATENT DOCUMENTS

| | | | |
|---|---|---|---|
| 385,697 | 7/1888 | Cudner | 100/297 |
| 492,206 | 2/1893 | Hunter et al. | 425/237 |
| 538,475 | 4/1895 | Albrecht | 425/237 |
| B 548,155 | 1/1976 | Armbrust et al. | 425/237 |
| 785,786 | 3/1905 | Wolff | 425/DIG. 230 |
| 1,127,925 | 2/1915 | Schueler | 425/DIG. 230 |
| 1,152,468 | 9/1915 | Zwoyer et al. | 425/237 |
| 2,367,962 | 1/1945 | Reibold et al. | 425/408 |
| 2,595,865 | 5/1952 | Lunsford | 425/237 |
| 2,662,246 | 12/1953 | Klugh et al. | 100/907 |
| 2,843,879 | 7/1958 | Komarek et al. | 425/237 |
| 2,945,259 | 7/1960 | Decker et al. | 425/237 |
| 3,015,199 | 1/1962 | McKeon et al. | 425/237 |
| 3,024,112 | 3/1962 | Burgess | 100/907 |
| 3,094,758 | 6/1967 | Downie et al. | 425/352 |
| 3,101,510 | 8/1963 | Packham | 425/DIG. 230 |
| 3,144,840 | 8/1964 | Crane | 425/DIG. 230 |
| 3,149,585 | 9/1964 | Forth et al. | 425/DIG. 230 |
| 3,205,838 | 9/1965 | Frobeen et al. | 425/DIG. 230 |
| 3,233,393 | 2/1966 | Lundell | 425/DIG. 230 |
| 3,328,843 | 7/1967 | Murphy et al. | 425/237 |
| 3,366,717 | 1/1968 | Rohaus | 425/237 |
| 3,430,583 | 3/1969 | Pool et al. | 425/141 |
| 3,431,594 | 3/1969 | Schenck et al. | 425/371 |
| 3,508,486 | 4/1970 | Polich | 100/98 R |
| 3,723,129 | 3/1973 | Bushmeyer et al. | 426/143 |
| 3,829,267 | 8/1974 | Woodward | 425/237 |
| 3,838,001 | 9/1974 | Greiner et al. | 100/297 |
| 3,889,884 | 6/1975 | Morse | 241/24 |
| 3,905,737 | 9/1975 | der Lely | 425/DIG. 230 |
| 3,923,316 | 12/1975 | Birnbaum et al. | 280/11.22 |
| 3,946,660 | 3/1976 | Kuhtreiber | 100/39 |
| 3,973,484 | 8/1976 | Jarrett et al. | 425/DIG. 230 |
| 4,018,149 | 4/1977 | Brunn | 425/DIG. 230 |
| 4,182,604 | 1/1980 | Wagner | 425/237 |
| 4,437,826 | 3/1984 | Tezuka | 425/408 |

FOREIGN PATENT DOCUMENTS

| | | |
|---|---|---|
| 0027824 | 5/1981 | European Pat. Off. . |
| 59713 | 2/1891 | Fed. Rep. of Germany . |
| 313674 | 2/1918 | Fed. Rep. of Germany . |
| 673272 | 3/1939 | Fed. Rep. of Germany . |
| 1784059 | of 1971 | Fed. Rep. of Germany . |

(List continued on next page.)

OTHER PUBLICATIONS

"Farm Machinery" by Claude Culpin., 10th Ed., 1981, Granada Pub., p. 211.
"Farmers Weekly", Jan. 20, 1984, p. 59.
Article by Graham Fuller, (date and source unknown), "Machines Put the Squeeze on Waste Straw".
"What's New in Farming", Oct. 1983, p. 44.
"Farmers Weekly", Apr. 6, 1984, p. 96.

*Primary Examiner*—Willard E. Hoag
*Attorney, Agent, or Firm*—Cushman, Darby & Cushman

[57] ABSTRACT

For forming fibrous crop or like materials into self-supporting products, an apparatus comprising first and second compression members arranged so that opposed closing faces of the compression members co-operate to define the principal pressure-generating surfaces of a compression space for a charge of the material, protrusions extending from one or both of said opposed faces being effective to define walls of the compression space, and drive means operative to reduce the distance between the opposed faces of the two compression members until there is minimal separation of the two members in the vicinity of the leading edges of the protrusions.

14 Claims, 12 Drawing Sheets

| | | | |
|---|---|---|---|
| 99095 | 7/1973 | Fed. Rep. of Germany . | |
| 2401666 | 7/1975 | Fed. Rep. of Germany . | |
| 3107744 | 9/1982 | Fed. Rep. of Germany . | |
| 882365 | 6/1943 | France . | |
| 559520 | 3/1975 | Switzerland . | |
| 488545 | 1/1976 | U.S.S.R. . | |
| 698577 | 7/1976 | U.S.S.R. . | |
| 641935 | 1/1979 | U.S.S.R. . | |
| 656610 | 4/1979 | U.S.S.R. . | |
| 677719 | 5/1979 | U.S.S.R. . | |
| 680685 | 8/1979 | U.S.S.R. . | |
| 694129 | 11/1979 | U.S.S.R. . | |
| 829034 | 5/1981 | U.S.S.R. . | |
| 0011261 | of 1890 | United Kingdom | 425/355 |
| 233015 | 4/1925 | United Kingdom . | |
| 713106 | 8/1954 | United Kingdom | 425/237 |
| 939759 | 10/1963 | United Kingdom . | |
| 1018519 | 1/1966 | United Kingdom . | |
| 1020364 | 2/1966 | United Kingdom . | |
| 1036931 | 7/1966 | United Kingdom . | |
| 1035261 | 7/1966 | United Kingdom . | |
| 1180898 | 2/1970 | United Kingdom . | |
| 1222673 | 2/1971 | United Kingdom . | |
| 1221497 | 2/1971 | United Kingdom . | |
| 1243696 | 8/1971 | United Kingdom . | |
| 1246477 | 9/1971 | United Kingdom . | |
| 1248552 | 10/1971 | United Kingdom . | |
| 1344470 | 1/1974 | United Kingdom . | |
| 1344469 | 1/1974 | United Kingdom . | |
| 1391281 | 4/1975 | United Kingdom . | |
| 1421503 | 1/1976 | United Kingdom . | |
| 1425652 | 2/1976 | United Kingdom . | |
| 1466305 | 3/1977 | United Kingdom . | |
| 1518605 | 7/1978 | United Kingdom . | |
| 2001579 | 2/1979 | United Kingdom . | |
| 1540869 | 2/1979 | United Kingdom . | |
| 2059742 | 4/1981 | United Kingdom . | |
| 2061905 | 5/1981 | United Kingdom . | |
| 2071560 | 9/1981 | United Kingdom . | |
| 2102270 | 2/1983 | United Kingdom . | |
| 2159689 | 12/1985 | United Kingdom . | |
| 2161742 | 1/1986 | United Kingdom . | |

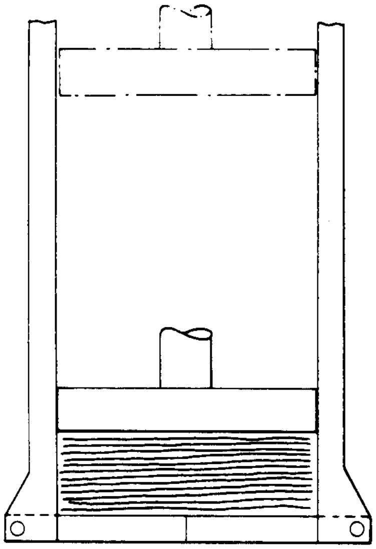
Fig.1
Fig.2a
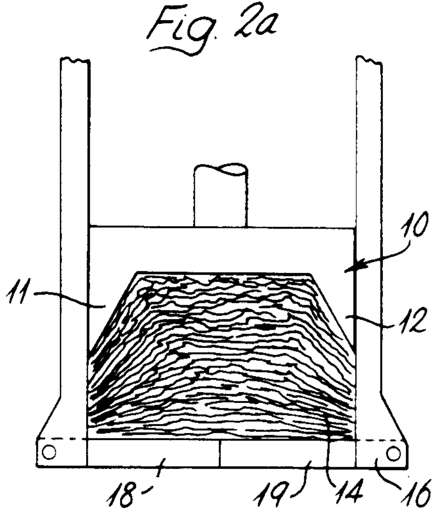
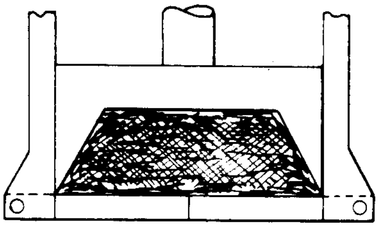
Fig.2b
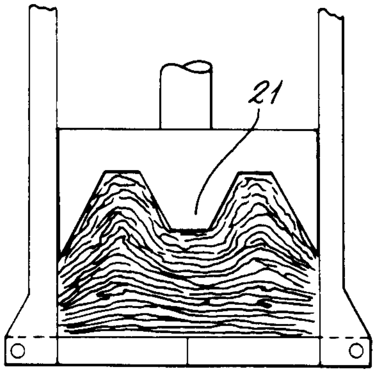
Fig.3a
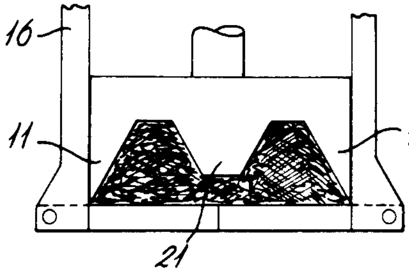
Fig.3b

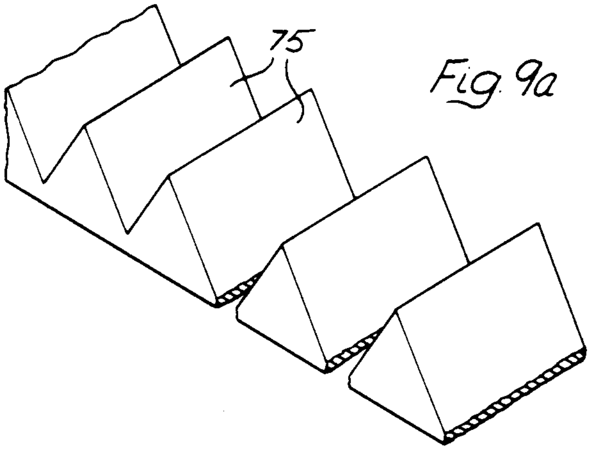
Fig. 9a
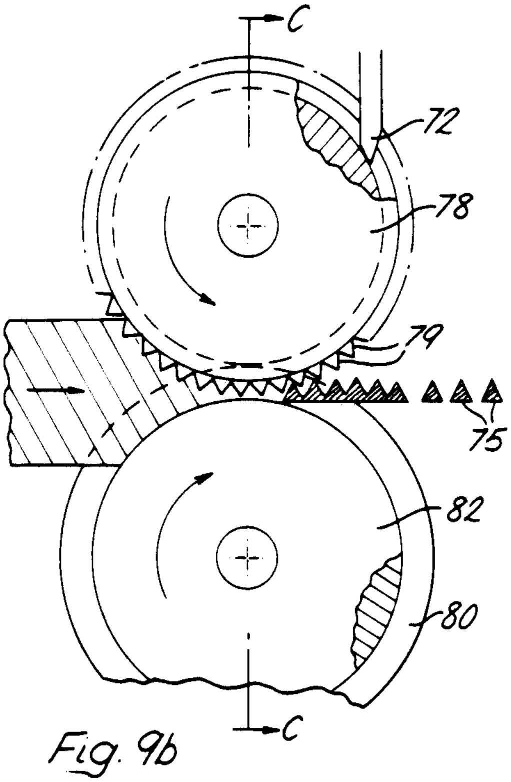
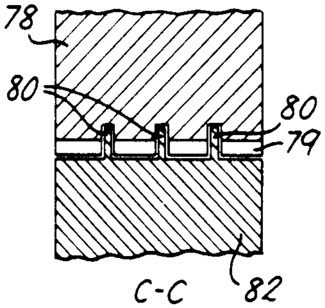
Fig. 9c
Fig. 9b

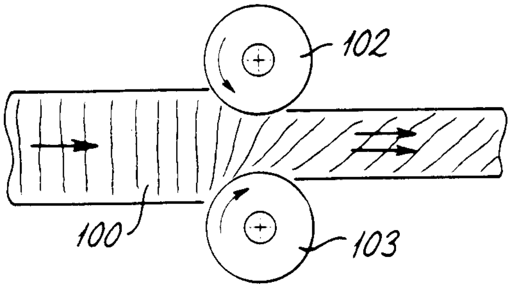
Fig. 12a
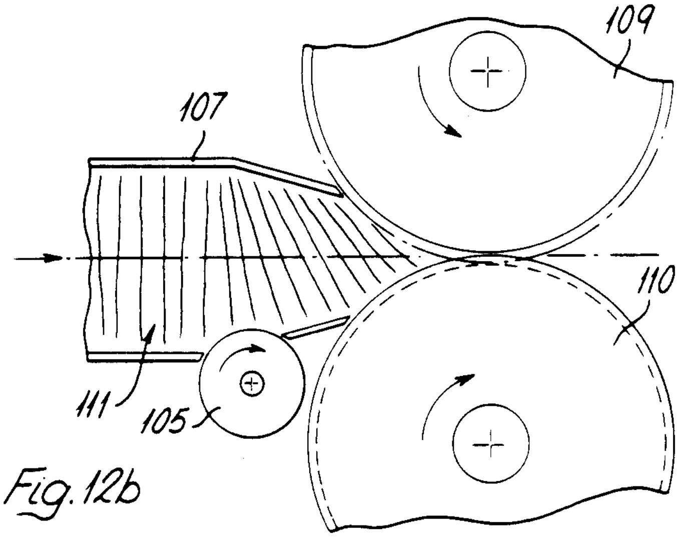
Fig. 12b
Fig. 12c
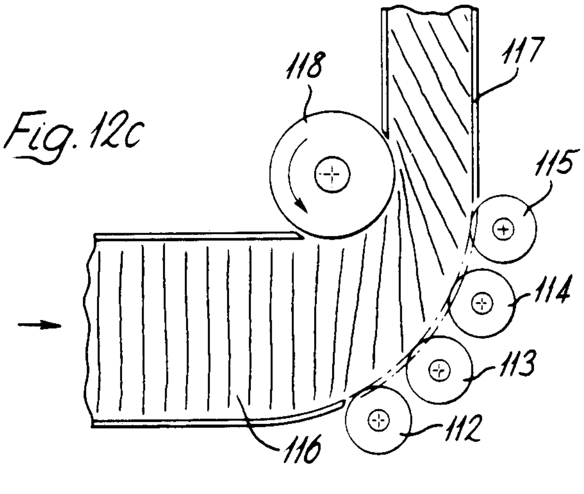

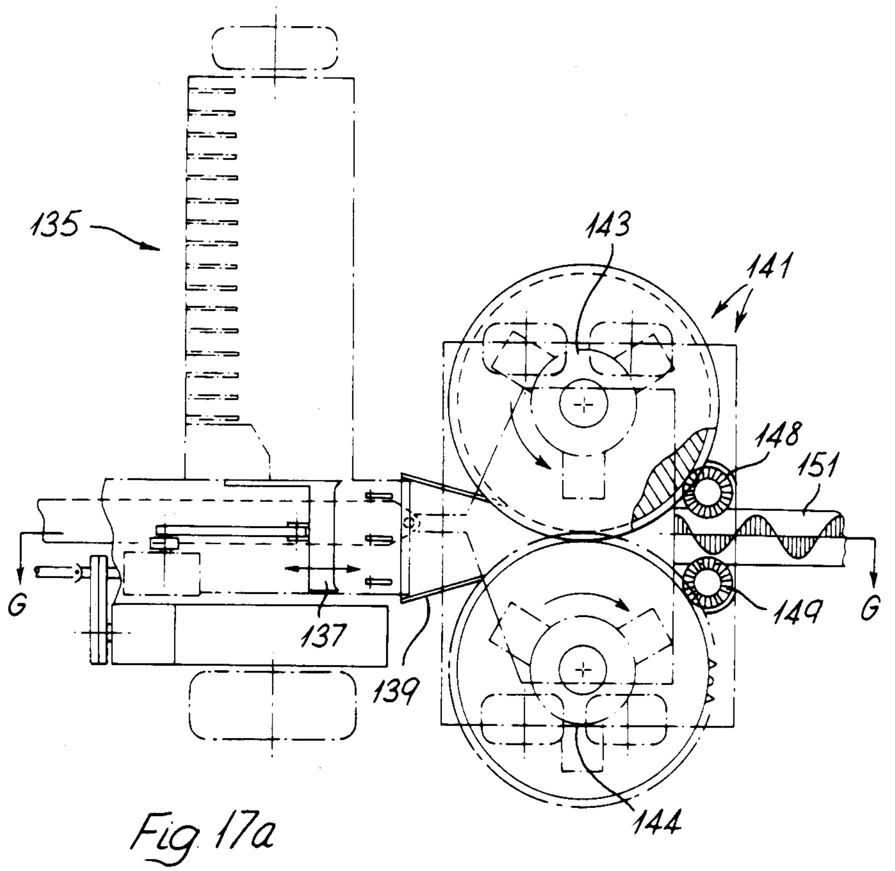
Fig 17a
Fig 17b
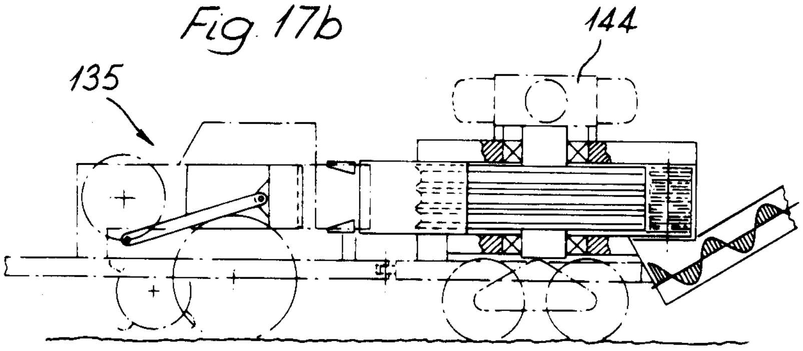

APPARATUS AND METHOD FOR BRIQUETTING FIBROUS CROP OR LIKE MATERIALS

The present invention relates to the forming into self-supporting products of comminuted and uncomminuted fibrous crop and similarly structured materials, e.g. paper, mixed wastes, wood shavings and saw dust, etc.

Throughout the specification, the term "briquetting" has been adopted as a matter of convenience to mean the making from fibrous crop and like materials of briquettes, wafers, blocks or any other self-supporting product. It is emphasized that this term does not impose any limitations of size or shape of these products.

Crop briquettes are small blocks or wafers of hay, straw, grain or other crops, or of mixtures of such materials. They are normally produced by first chopping or grinding the materials and then extruding them through roller- or piston-fed dies. The existing comminution and extrusion processes are very energy-demanding, the output of briquettes is low and production costs are high. It is also necessary at times to mix binding agents with the material to ensure adequate durability of the briquettes.

A less energy-demanding alternative to extrusion is to compress material in a closed-ended die. In this way, dense, durable crop briquettes can be made with finely comminuted dry crops. However, with uncomminuted materials, especially hay and straw, acceptable briquette density and durability can only be obtained at impractically high compaction pressures.

Past attempts to use the closed-ended die concept to form crop briquettes have usually involved forms of interacting gear wheels. For example, in GB Pat. No. 1 243 696, gear wheels are used to produce a variable ratio of crushed and whole forage material for subsequent processing into briquettes in a later mechanism (not disclosed). In GB Pat. No. 1 391 281, gear wheels have teeth so shaped and angled that crop trapped between them is laterally extruded. In U.S. Pat. No. 4,182,604, a pair of obliquely related wheels simultaneously compress and advance hay fed between them. Teeth on each wheel trap quantities of hay in pockets formed between them, and compression is essentially along two axes simultaneously and uniformly. With this system, substantial quantities of crop will inevitably become trapped in the interfaces between the co-operating teeth and the trapped material will be severely crushed. As a result it will adhere to one or both of the mating faces and, if it has to be removed, it will be wasted unless provision is made for re-circulation. In tough, fibrous crops the crushed material may remain attached to the briquettes as 'tails'. Other interacting gear wheel presses are also likely to have some of these disadvantages.

An object of the present invention is to provide a system in which the limitations and shortcomings of the existing methods and mechanisms are at least to a large extent overcome.

According to a first aspect of the present invention, an apparatus for forming fibrous crop or like materials into self-supporting products comprises first and second compression members arranged so that opposed closing faces of the compression members co-operate to define the principal pressure-generating surfaces of a compression space for a charge of the material, protrusions extending from one or both of said opposed faces and tapering towards the other one of said opposed faces being effective to define walls of the compression space, and drive means operative to reduce the distance between the opposed faces of the two compression members until there is minimal separation of the two members in the vicinity of the leading edges of the protrusions.

Conveniently, the protrusions and faces of the compression members combine so as in operation to compress the material triaxially i.e. along three identifiably different axes. One way of doing this would be for the compression members to operate to apply pressure with components in three mutually orthogonal directions.

In a preferred embodiment of the invention, the compression space is provided by a pocket, die chamber, or cell, defined by said opposed faces and by said opposed walls which take the form of product width- and length-determining rib-like protrusions extending from one or both of the faces. In operation of this embodiment, localised zones of high pressure are generated in an initially uniformly dense layer of material in such a way that a proportion of the material is displaced within the compression space so as to create within each product zones of such high bond strength that the product as a whole attains and retains high density and adequate durability for repeated handling.

Conveniently, the apparatus includes one or more projections extending from one or both of the opposed faces of the compression members into the space bounded, or in part bounded, by the wall-providing protrusions.

Conveniently, the one or more projections are of a resilient nature to allow for some deformation on compression.

Conveniently, the compression members comprise a plunger and an end face against which the plunger compresses the material. In one embodiment, for example these two components form part of a stationary briquetting press.

Preferably, the compression members instead comprise two co-operating compression rotors, conveniently in the for of two rollers or a roller and a ring or two rings. In one such embodiment, for example, the apparatus comprises a mobile crop briquetting press with integral facilities for collecting crop from the ground and forming it into a pre-compacted column for feeding into the nip of the compression rotors. One such integral crop-collecting and column-forming and advancing mechanism, for example, might comprise an in-line pick-up, horizontal stub augers or vertical rotors preceding a sweep-fork or swinging-ram feed system, and two pairs of oppositely located, orbitally actuated, crop gripping and advancing, converging walls forming a pre-compaction chamber. Alternatively two banks of toothed rollers might be used for feeding the rotary press or a roller-supported belt or cleated-chain type conveyor might be used instead. A further alternative is a crop-walker type feed system.

As an alternative, the mobile crop briquetting press is constructed for attachment to a pick-up baler, for example as a trailed unit, on to another pick-up device.

Conveniently, when a pre-compaction device is provided upstream of the crop briquetting press, then feed means are provided for modifying the dimensions of a crop column emanating from the pre-compaction device to make the column dimensionally compatible with the briquetting press and to provide or augment the force necessary to feed the material into the press.

To make rotary briquetting presses suitable for materials which are comminuted, granular or mixtures of both, appropriate facilities would be provided for metering, feeding and guiding these materials into the press. For control of briquette density, crop column dimensions and the direction and rate of feeding material into the nip of the compression rotors, a feed roller system or a supported belt or cleated-chain conveyor could have considerable relevance and importance. For example, if the pre-compaction device operated intermittently, as it would if it were a crop baler piston for instance, the drive to the feed system could be related to the compression mechanism or vice versa e.g. the feed system too could be activated intermittently and with it, the drive to the compression rotors.

In embodiments of the invention where rotors are used to compress the charge, the protrusion-providing elements are preferably attached to rims which may be shrunk or keyed on to, or otherwise attached to, plain cores of the rotors. This facilitates replacement of worn or damaged pieces or changing the design of the product-forming attachment, e.g. to vary product size. It may be desirable in such cases to introduce some form of yielding between the two compression rotors, for example, to accommodate a momentary overload or a foreign object. When the intended products are not continuous slabs or bands of high-density material, then incomplete separation of the products by the compression members may be prevented by means operable to pre-cut the material before it is compressed to maximum density.

Conveniently, the one or more protrusions are provided on only one of the compression rotors and the drive means is operable to rotate the rotors at different peripheral speeds to one another.

Alternatively, the one or more protrusions may be provided on both rotors and drive means are provided to ensure that the rotors rotate in synchronism.

Conveniently, the apparatus includes means for supplying a column of material to the compression rotors, optionally with one face of the column moving at a different velocity to that of the opposite face thereof.

Conveniently, the apparatus includes control means for varying the speed of the feed means in dependence on the measured or estimated density or average density of the material being compressed in the compression space. In one embodiment, for example, tension in the structural components joining the rotor centres together provides a particularly good indicator. Alternatively, the control of briquette density may instead be related to some parameter of the column-forming or feed mechanisms upstream of the product-forming system. For example, where a piston is used in the column-forming or feed mechanism, then the piston force needed for compaction or the tensile forces generated across the outlet of the forming chute for the material are used to yield signals which will allow adjustment of the press rotor speed in anticipation of changes in the nip region.

Conveniently, the feed means comprises a reciprocating piston with projections from the piston face spaced apart in plan view and tapering in side view, or vice versa, so as in operation to cause the crop charge to assume a transverse wave form.

Conveniently, the projections are fins.

Conveniently, the leading edges of the projections provide a cutting effect.

Conveniently, the feed means comprises a profiled rotor presenting tapering protrusions when viewed in the direction of crop travel through the apparatus so as in operation to cause the crop to assume a transverse wave form.

Conveniently, the protrusions provide a cutting effect.

Conveniently, the transverse length-defining rotor protrusions are ribs of semi-circular, parabolic or arcuate cross-section.

Conveniently, the rotor protrusions include an intermediate rib of semi-circular, parabolic or arcuate cross-section operative to form a full-width central briquette indentation.

According to a second aspect of the invention, a method of forming a self-supporting product from fibrous crop or like materials comprises the steps of loading the compression space with the material to be compressed and thereafter applying pressure to compress the material so that it bonds together tightly and durably.

Conveniently, pressure is applied to the material triaxially e.g. with components of pressure acting in three mutually orthogonal directions. This feature is equally valuable whether the material is uncomminuted, fibrous or in sheet form or is left coarse after partial comminution.

Conveniently, the method includes the steps of dividing the self-supporting product from adjacent material or so weakening any connection with this material as to facilitate the subsequent separation therefrom. Thus in one embodiment of the invention using a multiple array of product-forming cells, tapered length- and width-defining protrusions are shaped so that they cause individual products to be cleanly separated by failure in tension and/or shear from a continuous charge of material without the need for contact to be made with the opposing faces of the compression members and without substantial build-up or waste of material occurring.

Alternatively, the method includes the step of controlling clearance and/or compaction pressure to avoid complete separation of the compressed mat of material into discrete products and 'embossed' bonded slabs or bands may be formed for convenient handling in flat form or in rolls, for economic transportation, and for easy automatic stoking of boilers in the case of straw destined for combustion.

Conveniently, the method may include the step of separating the slabs or bands at intervals, into items which may be handled, by means of occasional length-defining ridges or othe suitable protrusions of greater height than the other protrusions present.

Conveniently, the method also includes the step of supplying a column of the material to be compressed in such a way that the material on one side of the column is moving at a different velocity from that of the material on the opposite side.

The invention also extends to products formed using the method and/or apparatus of the present invention.

BRIEF DESCRIPTION OF THE DRAWINGS

FIG. 1 is an elevation of a conventional closed-ended die;

FIGS. 2(*a*) and 2(*b*) are elevations of a first embodiment of the invention showing two different stages in the briquetting process;

FIGS. 3(*a*) and 3(*b*) are elevations of a second embodiment of the invention again showing two different stages of the briquetting process;

FIG. 7(*b*) is a section taken along the line A—A in FIG. 7(*a*);

FIG. 7(*c*) shows on a larger scale two versions of a detail of the sixth embodiment in elevation;

FIG. 8(*b*) is a section taken along the line B—B in FIG. 8(*a*);

FIG. 9(*a*) shows materials bonded by an eighth embodiment of the invention;

FIG. 9(*b*) is an elevation of this embodiment on a smaller scale than FIG. 9(*a*);

FIG. 9(*c*) is a section taken along the line C—C in FIG. 9(*b*);

FIG. 10(*b*) shows a view taken along the line D—D in FIG. 10(*a*);

FIG. 11(*b*) shows a view similar to that of FIG. 10(*b*) but this time taken along the line E—E of FIG. 11(*a*);

FIG. 12(*a*) shows a section of a material-orientating device for use with briquetting machines according to the present invention;

FIGS. 12(*b*) and 12(*c*) are sections of two alternative forms of material-orientating device to that shown in FIG. 12(*a*);

FIG. 14(*b*) is a sectional view taken on line H—H in FIG. 14(*a*);

FIG. 16(*b*) is a part-section taken along the line F—F in FIG. 16(*a*);

FIG. 17(*a*) is a plan view of a pick-up baler incorporating a briquetting machine in accordance with the present invention;

FIG. 17(*b*) is a part-section taken along the line G—G in FIG. 17(*a*);

FIG. 18 is a view similar to FIG. 16(*a*), but showing a variation in which the rotors take the form of two rings;

FIG. 19 is a view similar to FIG. 7(*a*), but showing a variation in which there is a cross-belt drive between the rotors; and FIGS. 20*a*, 20*b*, 20*c* and 20*d* are views similar to FIG. 7*a*, but showing respective variations in which the transverse length-defined rotor protrusions are ribs of semi-circular, parabolic or arcuate cross-section, and the intermediate ribs are of semi-circular, parabolic or arcuate cross-section operative to form a full-width central briquette indentation.

Figure 4A:
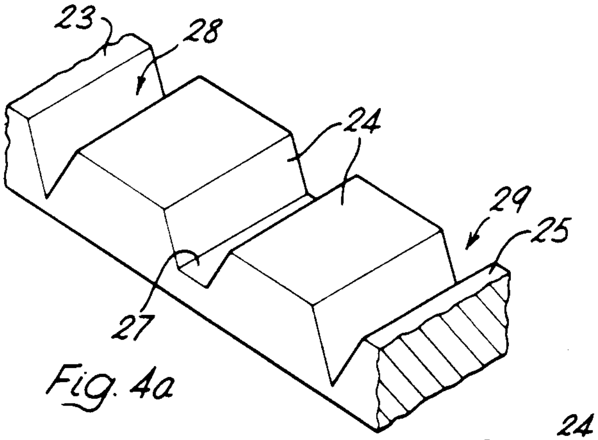
FIGS. 4(*a*) and 4(*b*) are respectively perspective and side views of material bonded by a third embodiment of the invention (not shown)

Turning first to FIG. 1 of the drawings, as already mentioned this shows a conventional arrangement in which a piston in a closed-ended die is compressing material uni-axially. For simplicity and clarity the material is shown to be long and layered horizontally. Taking the straw and hay in particular, it has been found that, if they are left long, compression to maximum densities in excess of 1000 kg/m$^3$ is insufficient to prevent subsequent relaxation to relatively low final product densities and unacceptably low durability.

By contrast, FIGS. 2(*a*) and 2(*b*) show a briquetting machine in which the flat-faced piston of the FIG. 1 device has been replaced by a plunger 10 having downwardly tapering side protrusions or extensions 11,12.

FIG. 2(*a*) shows the situation where the piston or plunger 10 is being forced into a layered die charge of uncomminuted crop 14. As will be apparent from the Figure, the extensions 11,12 act to force crop away from the sides of the die 16 and cause successive layers of the crop to bend, buckle and progressively assume the contour of the plunger face as the plunger moves towards the die closure plates 18,19. As the process continues, the rippled crop layers become compressed, and some of the inclined material is crushed axially. These effects help to destroy much of the structural strength of the material and, in consequence, reduce the tendency for the resulting briquettes to expand, or relax, after maximum compression. In addition, sliding of material into interstitial spaces in response to multi-axial compressive forces enhances the interlocking effect. When the end of the plunger travel is reached, zones of exceptionally high bond strength have formed within the briquette, as shown in FIG. 2(*b*). After reversal of the plunger movement, the zones of high bond strength achieved limit the amount of relaxation and a high density is retained.

The plunger 10 may be of any convenient shape when viewed in plan. For example, it could be of rectangular or square plan view. In this case extensions 11,12 could be either be two separated wall sections running along opposite sides of the plunger or they could be, and preferably are, part of a continuous wall section running round the entire edge region of the plunger. A continuous wall section is also to be preferred when the plunger is of circular or other convenient shape when viewed in plan.

The advantage of having a continuous-walled plunger is that whereas with the two-wall version, the material will only be transversely pressurised in one direction (corresponding to the wall-to-wall dimension of the plunger), with the continuous-wall versions described above, the material will instead be subjected to transverse pressures in a plurality of directions and this improves the mechanical integrity of the resulting product.

It is also possible to provide multidirectional transverse pressures with a number of separated wall sections but, although this feature is to be included within the scope of the present invention, it does not represent one of its preferred embodiments.

In order further to improve the mechanical integrity of the product, the principle of operation described above may be extended by the provision of an additional projection or protrusion 21 from the central region of the plunger face as shown in FIG. 3(*a*). In this instance the cross-sectional shape of the additional protrusion is that of a blunt-ended wedge, and its effective depth is less than that of the side extensions.

In operation, the central protrusion 21 accentuates the distorting effect the plunger has on successive crop layers. Additionally, however, some crop becomes trapped under the leading face of the central protrusion, and this leads to a third zone of high mechanical bond strength being formed as shown in FIG. 3(*b*).

The closed-ended die approach to crop wafering described above can be put into effect with single- or multiple-cell punch presses. To permit easy extraction of the wafers produced, the die closure plates 18,19 may be made removable, for example by hinges as shown or provision of a rotary arrangement. Additional plunger travel may be used to dislodge the compressed charge.

Figure 4B:
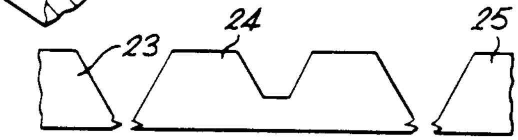

An alternative to the intermittent production of briquettes by punch-type piston presses is the continuous transformation of an endless layer of crop material into a stream of briquettes. It requires a succession of product-forming cells to be closed and opened in a continuing process. In FIG. 4(*a*) are shown the imprints left by an array of shaped press tools on a section of a continuous layer of crop. In this instance, the depth of the layer or the penetration of the briquette-forming tools into it were selected so that successive briquettes 23,24,25 remain attached to each other. The central 'seam weld' 27 produced across the width of the briquette strip by protrusion 21 is located between the two deeper, wedge-shaped imprints 28,29 produced by extensions 11,12. FIG. 4(*b*) shows in cross-section how slightly deeper penetration of the briquette length-defining ribs causes the last few millimeters of crop layer depth to fail in tension.

Figure 5A:
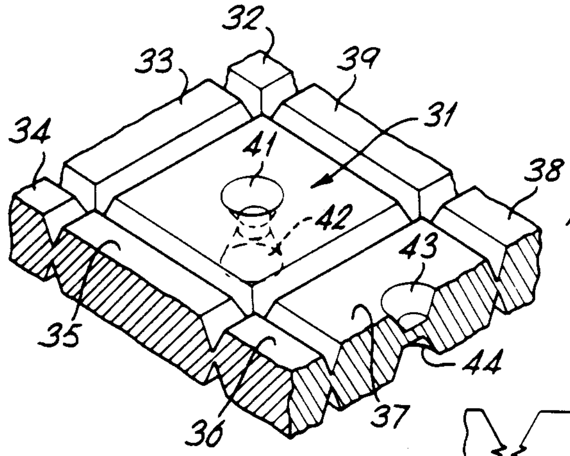
FIGS. 5(*a*) and 5(*b*) are respectively perspective and side views of material bonded by a fourth embodiment of the invention (not shown)
Figure 5B:
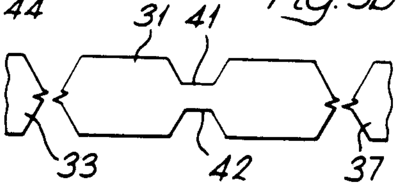

Whilst in FIGS. 2-4 the briquette-forming tools are shown to intrude from one side only. FIG. 5(*a*) depicts a slab 31 of material compressed differently, showing particularly the imprints of the press tools at the top and at the bottom. Again, individual briquettes 31-39 are not separated, and in this instance pedestal-type extensions from the plunger face and the co-operating face of the die are used to produce indentations 41,42,43 and 44 which bind some of the material displaced by the central extensions and helps the bonding process in the adjacent regions. It is slabs of this form which may be stacked flat in finite lengths, or they may be rolled up as a continuous band.

FIG. 5(*b*) illustrates in cross-section the effects of bilateral compression, the central indentation and the separation of adjacent briquettes by failure in shear and tension of the central crop layer. It is this form of failure occurring ahead of a wedge-shaped element being driven into the material which obviates the need for the briquette length- and width-defining extensions actually having to make contact with the die face or wall element opposite.

It should be noted that forming briquettes by the intrusion of projections from one side only, rather than from opposite sides simultaneously, has the fundamental advantage of making precise synchronisation of opposing partitioning elements unnecessary. Thus, if asymmetry about the central briquette plane normal to the axis of compression is acceptable, all briquette width-defining protrusions may be attached to one of the opposed cell faces and all length-defining protrusions plus any means of forming indentations may be attached to the opposite face.

Figure 6:
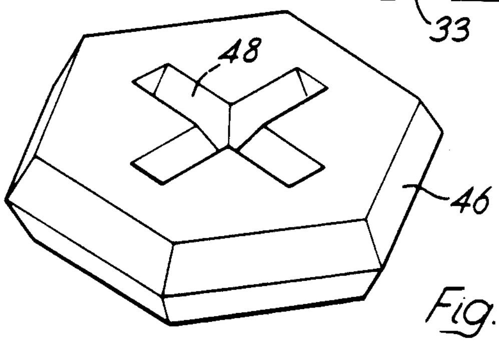
FIG. 6 is a perspective view of a self-supporting product produced by a fifth embodiment of the invention (not shown)

FIG. 6 shows a hexagonal briquette 46 formed in accordance with the present invention and having a cross-shaped central indentation 48 pressed into the product to increase mechanical bonding as before.

In general terms, it should be noted that the briquette width- and length-defining wall elements will normally need to be made from hard and durable materials, whereas any elements designed to achieve an interspersed indentation effect may have a degree of resilience, to allow some deformation in compression.

So far, only plunger-based batch-type systems have been described in accordance with the present invention. However, continuous briquette production may also be achieved, if desired, most simply with a roller press. The arrangement shown in FIGS. 7(*a*) and 7(*b*) is particularly suitable.

Thus referring now to these two Figures, reference numeral 50 indicates a roller press in which the upper roller 52 is provided around its circumference with transverse rows of briquette length-defining tooth-like protrusions 54 and interspersed blunt elements 55 to achieve a central indentation effect. The lower roller carries continuous circumferential ribs 59 which taper outwardly from the outer leading edges towards the roller centre, the inner ones of the ribs 59 being arranged so that they form a double bevel and the outer ones of the ribs 59 forming single bevels.

The rollers 52,57 have a fixed centre distance and counter-rotate in the direction of the arrows shown so that a pre-compacted crop column fed into the nip of the rollers from the left is gradually compressed and formed into briquettes which are separated from each other by the action of the length- and width-defining ribs.

Figure 7A:
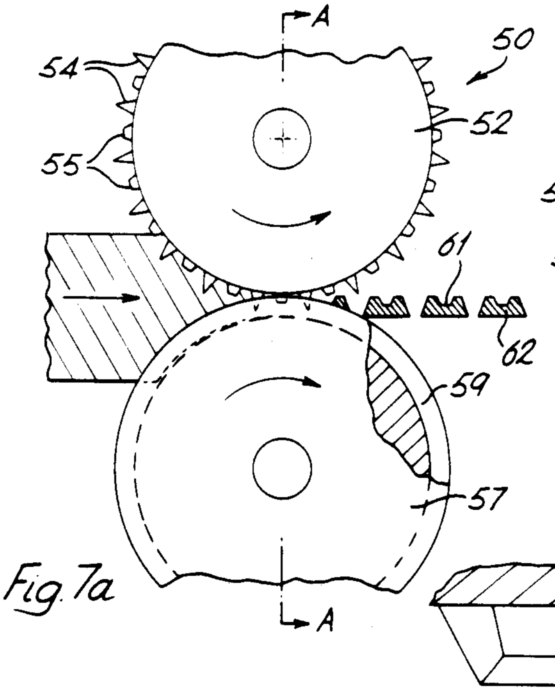
FIG. 7(*a*) is a scrap view showing part of a sixth embodiment in elevation.
Figure 7B:
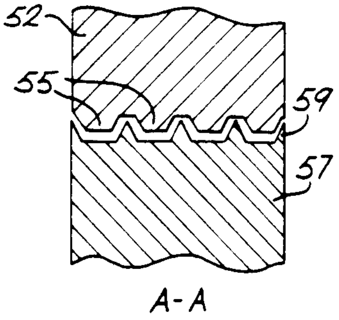
Figure 7C:
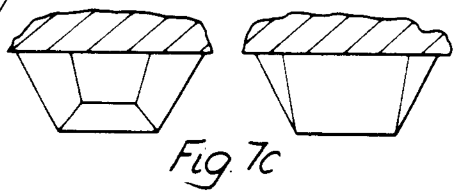

The view in the direction of arrows AA shows in FIG. 7(*b*) a section through the protrusions 55 on the upper roller, which are designed to cause indentations in the centre region 61 of each briquette 62 (FIG. 7(*a*)), and through the tapered width-defining circumferential ribs 59 on the lower roller 57.

It is a particular advantage of this last arrangement that the lower roller 57 carrying the briquette width-defining ribs 59 may be driven at speeds which differ from those of the upper roller 52. In consequence a 'smearing' and heating effect may be induced on the briquette surfaces in contact with the lower roller 57 and the ribs thereon, particularly if the peripheral speed of the lower roller is faster than that of the upper roller. The inverse speed differential with the upper roller moving faster constitutes a convenient device to effectively reduce the depth of the crop column being fed into the press 50 by increasing the speed of advancement of the upper portion of the horizontally pressurised column. The speed adjustment may be affected automatically in response to variations in the driving torque of the rollers or to other changes reflecting variation of wafer density, for example the tension in the members connecting the roller centres. Thus, any selected briquette density can be maintained relatively simply, especially if the drive to the rollers is provided hydraulically.

FIG. 7(*c*) shows enlarged front view of two designs of transverse briquette length-defining protrusions suitable for items 54 in FIG. 7(*a*). Particular attention is drawn to the fact that the sides of the protrusions complement the width-defining ribs on the lower rotor, being bevelled to prevent crop from being trapped in the interfaces.

Figure 8A:
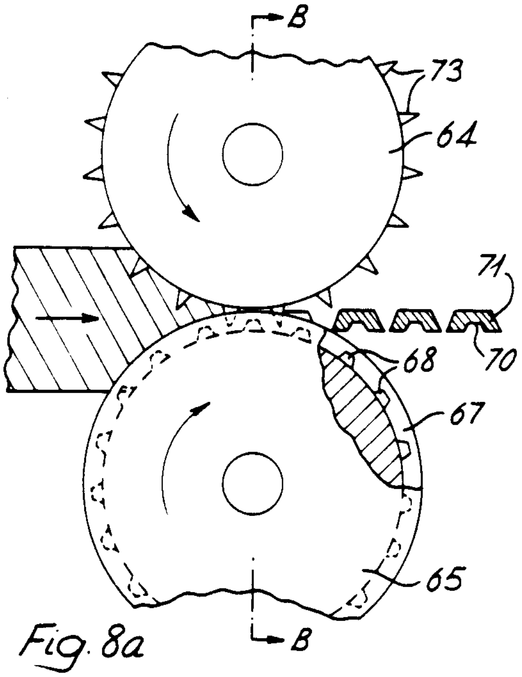
FIG. 8(*a*) is a scrap view showing part of a seventh embodiment in elevation.
Figure 8B:
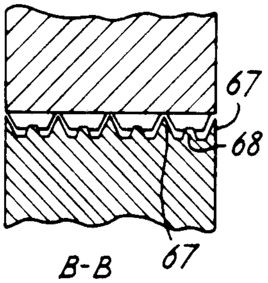

FIG. 8(*a*) shows an alternative design of rotary press which differs from the press 50 of FIG. 7(*a*) in requiring rotational synchronisation of the two rollers 64,65. In addition to the briquette width-defining ribs 67, the lower roller 65 is fitted with protrusions 68 which effect the indentations 70 in the centre region of the wafer 71. This makes it necessary for the briquette length-defining protrusions 73 on the upper roller 64 to intermesh accurately. The view in the direction of arrows BB in FIG. 8(*b*) gives the cross-sectional surface details of the two rollers.

To maintain the selected briquette density with the arrangement of FIGS. 8(*a*) and 8(*b*), it becomes necessary to vary the speed of the drive common to both rollers. If totally symmetrical briquettes are an objective, the synchronised drive system makes it possible to attach half-depth protrusions of all three types to the surfaces of both rollers, so that they always oppose each other during rotation.

Turning now to FIG. 9(*a*), this shows briquettes 75 of triangular-prism shape formed in a roller press of the form shown in FIGS. 9(*b*) and 9(*c*). The upper roller 78 in this press carries rows of transverse teeth 79 which are triangular in cross-section, whilst annular discs 80 may be attached at intervals across the width of the lower roller 82 to register with circumferential recesses in the upper roller as best seen from FIG. 9(*c*) which shows a cross-sectional view of the centre section in the direction of arrows CC. Thus the briquettes 75 are cut into widths equivalent to the disc-to-disc spacing on roller 78. Partitioning is aided if the lower roller is driven slightly faster than the upper roller. Feeding of the crop into the nip is aided if the edges of the discs are serrated. To prevent material building up in the circumferential recesses, flat scrapers may be fitted as shown at 72.

In an alternative system designed to leave the prism-shaped briquettes full-width, the roller 82 is plain. In this case, the briquettes may either be separated from each other or, if preferred, they may be kept joined by appropriately setting the depth of intrusion of the transverse ribs. This system is particularly suitable for crop materials which are aligned either randomly or principally in the direction of crop flow. Joined bands of briquettes may be stacked layered, with every other band inverted to achieve maximum bulk density, or they may be formed into rolls.

It is envisaged that in any of the rotary press arrangements described above in accordance with the present invention, be it twin-roller or ring-and-roller, advantage may be gained from the transverse briquette length-defining ribs, as opposed to the circumferential width-defining ribs, being semi-circular, parabolic or arcuate in cross-section. In addition, it may be advantageous also to use an intermediate rib of one such cross-sectional shape to form a full-width, central briquette indentation.

Figure 10A:
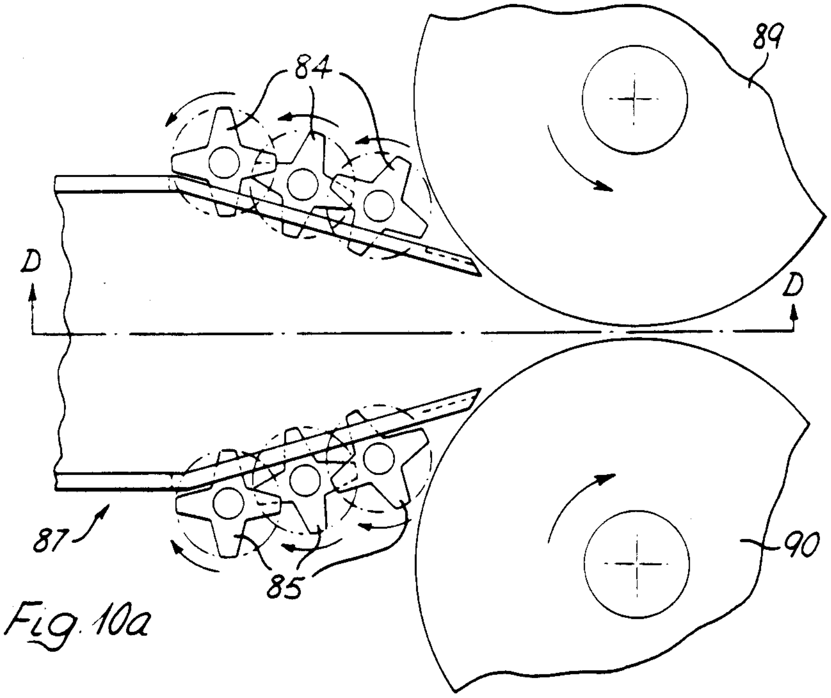
FIG. 10(*a*) shows a plan view or elevation of a feed mechanism for use with briquetting machines in accordance with the present invention.
Figure 10B:
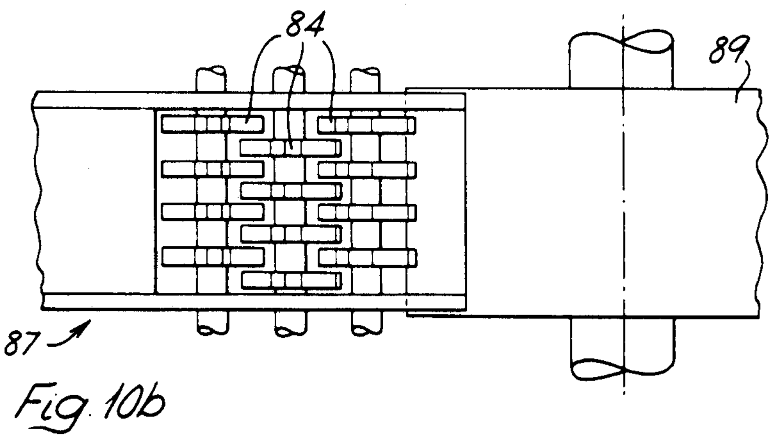

With any of the roller presses discussed in the preceding sections, the roller diameters have to be large in order to achieve satisfactory continuous feeding of an adequately dimensioned, pre-compacted column of crop. Feed assisting mechanisms are necessary if roller diameters are to be kept minimal. FIG. 10(*a*) is a plan or side view of a rotary force feeding and crop compaction system which is particularly suited for long, fibrous crop materials. In this system, intermeshing star rotors 84,85 of the feed section 87 converge towards the nip of the press rollers 89,90 on both sides of the crop path. At the delivery end of the section 87, the teeth forming the star configuration on rotors 84,85 may intermesh with the circumferential ribs on one of the press rollers 89,90. FIG. 10(*b*) is a view of one set of feed rollers taken along the line DD in FIG. 10(*a*).

Figure 11A:
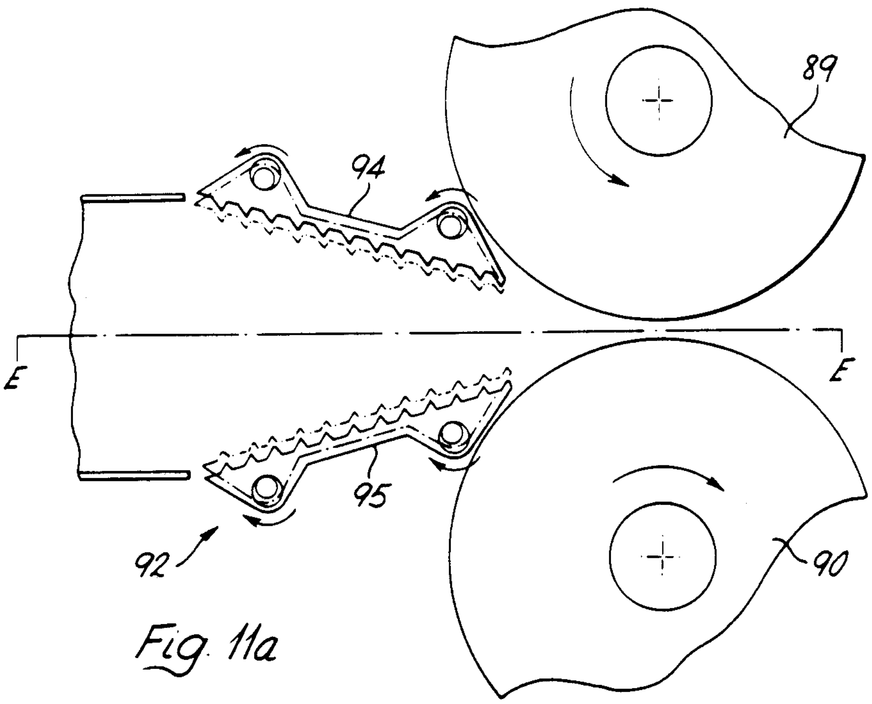
FIG. 11(*a*) shows a plan or side view of an alternative form of feed mechanism to that shown in FIGS. 10(*a*) and 10(*b*)
Figure 11B:
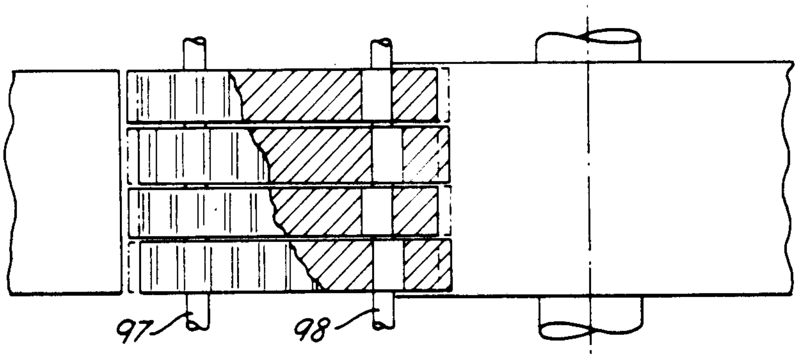

FIGS. 11(*a*) and 11(*b*) depict an alternative feed system 92 for the rollers 89,90 consisting of two sets of converging crop 'walkers' 94,95 the toothed bars of each set being joined together by at least two crank shafts 97,98 which cause the teeth on adjacent bars to engage the crop alternately and force it into the mouth of the press. FIG. 11(*b*) is a view of one set of toothed bars taken along the line E—E and part in section for clarity.

Returning again to the arrangement of FIGS. 10(*a*) and 10(*b*), it should be noted that it is one advantage of a roller feed system that the roller or rollers 84 defining one side of the feed duct may be driven at a speed different from that of the roller or rollers 85 opposite. In this way the transversely defined crop layers will be advanced faster on one side than the other and become 'slewed'. In consequence, at constant throughput the crop column width is reduced, and this is a further method of maintaining the optimal charge rate of a briquetting press, optionally in conjunction with a press roller speed control. With this objective in mind, FIG. 12(*a*) shows, on a reduced scale, a two-roller system for differentially advancing the layers of material 100 being forced through a duct in the direction of the arrows. As shown, the speed of the upper roller 102 is higher than that of the lower roller 103, resulting in the angling of the layers indicated and in an increase in the rate of advancement of the column as a whole. It also leads to a reduction of column width, if FIG. 12(*a*) is taken to be a plan view, or of column height if it is regarded to be a side view. Attention is drawn again to the fact that only one roller is necessary to achieve these objectives allowing the wall opposite the only roller to continue flat.

It should also be noted that in a converging feed arrangement linking a pre-compaction mechanism to a briquetting press, a driven roller or series of rollers need be provided only on one side, to achieve the slewing and column width reduction effects. Furthermore the principle is equally applicable to advancing a crop column faster at the top or bottom. This is a convenient way of reducing the height of the crop column emanating from a conventional, unmodified pick-up baler, so that the briquetting roller width can be kept small, for example to 200–250 mm. By locating the only roller or the most downstream of a series of rollers at the inner bend of an angled or curved feed duct, a change of direction, may be brought about in addition to any required reduction in column height or width, as determined by roller speed. Thus, the common axis of a twin-roller briquetting press need not necessarily lie in the same plane nor at right angles to the direction of crop flow from any pre-compacting mechanism.

FIG. 12(*b*) shows how a single crop advancing roller 105 in a converging pressurised feed duct 107 may be used to orientate the crop layers favourable for transfer to the briquetting rollers 109,110. The layers of material 111 are advanced more on first contact with the roller 110 carrying the circumferential briquette width-defining ribs and this compensates for the slightly poorer crop conveying capability of that roller.

FIG. 12(*c*) is an example of an arrangement in which rollers 112–115 are being used to achieve a change of direction plus a reduction in column width for material 116. Some or all of the rollers shown around the outer bend of the duct 117 are optional. If they are driven, their peripheral speed, relative to that of the single roller 118 at the inner bend, determines the inclination of the slices and the modified width of the crop column.

Any roller for differentially advancing crop column in the manner described with reference to FIGS. 10(*a*), 12(*a*), 12(*b*) or 12(*c*) may be fluted or polygonal in cross-section or it may be spiked, ribbed or provided with teeth. In the direction of rotation, any leading edges or faces should preferably be reclined relative to the radial plane to ensure easy and clean disengagement from contact with the crop.

Figure 13:
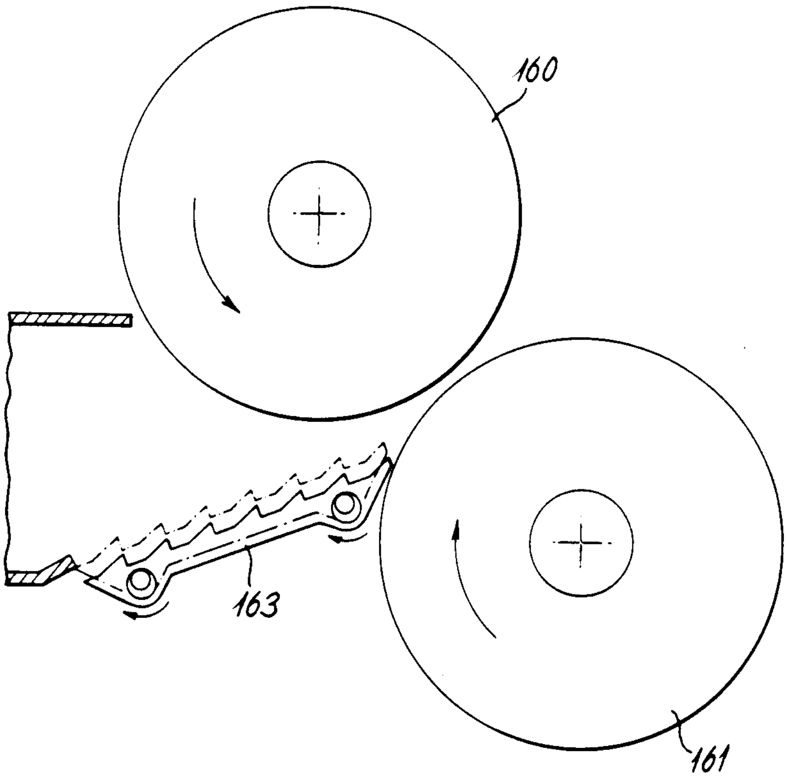
FIG. 13 is a plan or side view of a further alternative form of material-orientating device.

An alternative arrangement of feeding the material from the end of a pressurised duct into the nip of a twin-roller press is shown in FIG. 13, which may be regarded optionally as a plan view or a side elevation. The common axis of the two press rollers 160,161 in this embodiment lies at an angle to the direction of crop advancement in such a way that one of the rollers (160), preferably that which carries the transverse briquette length-defining ribs, intrudes into the crop path opposite a set of crop 'walkers' 163, as previously described in FIGS. 11(*a*) and 11(*b*). The arrangement gives the advantages of saving one array of 'walkers' and of reducing the maximum width or height dimension of a twin-roller briquetting press.

Figure 14A:
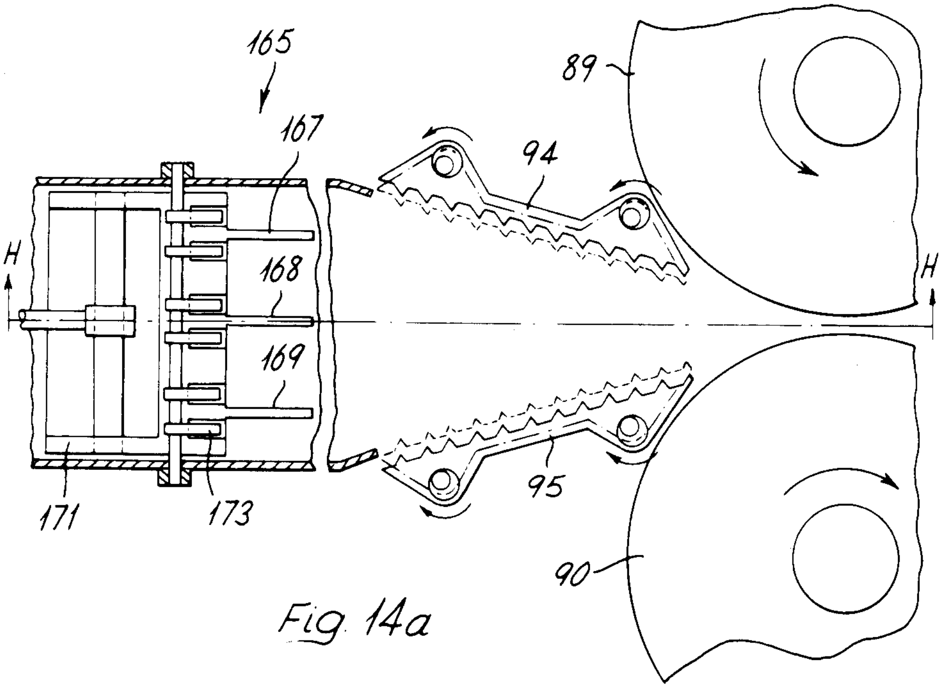
FIG. 14(*a*) is a plan or side view of yet another alternative form of material-orientating device.
Figure 14B:
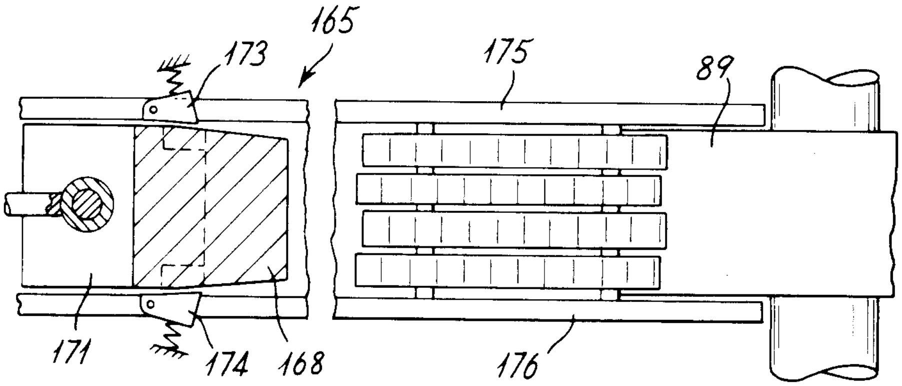

In FIG. 14(*a*), the crop feed and compaction system disclosed in FIGS. 11(*a*) and 11(*b*) is combined upstream with a reciprocating-piston pre-compaction and force feeding mechanism 165 which also causes each charge to assume a transverse wave form. This is achieved by means of three protruding fins 167,168,169 incorporated in the face of piston 171. In practice, these fins concentrate the piston pressure in three regions, allowing crop on either side of each fin to lag behind. Subsequently, as the dimension of the crop column is reduced by further compaction perpendicular to the plane of the protrusions on the piston face, the waves or 'crimps' in the crop layers become folds, and ultimately these contribute to the mechanical interlocking which preserves briquette density.

The number of protrusions on the piston face may be varied; if only one is used, then a 'herringbone' effect will be achieved. Optionally, the protrusions may be provided in the plane perpendicular to that shown. The length of the feed duct between the end of the piston travel and the compaction mechanism preceding the briquetting rollers can be varied in accordance with requirements.

In a variation (not shown) of this embodiment, the crop walkers 94,95 are replaced by a curved arrangement of overlapping and intermeshing star rollers of similar design to those shown in FIGS. 10(*a*) and 10(*b*) but without guides on the crop-engaging side of the set of rollers.

FIG. 14(*b*) is a sectional view on the line H—H in FIG. 14(*a*). It shows the shape of the fin projections (168) on the piston face and that of the spring-loaded, pivoted hay dogs 173,174 on opposing feed chamber walls. During compaction of a new charge, the hay dogs are forced to retract at their trailing edges, but when the piston 171 returns for the next charge, the springs force the hay dogs into the chamber, to retain the previous charge. The chamber wall plates 175,176 are continued over the intermediate feed mechanism and the nip region of the briquetting rollers, to prevent crop from being squeezed out under pressure.

Figure 15A:
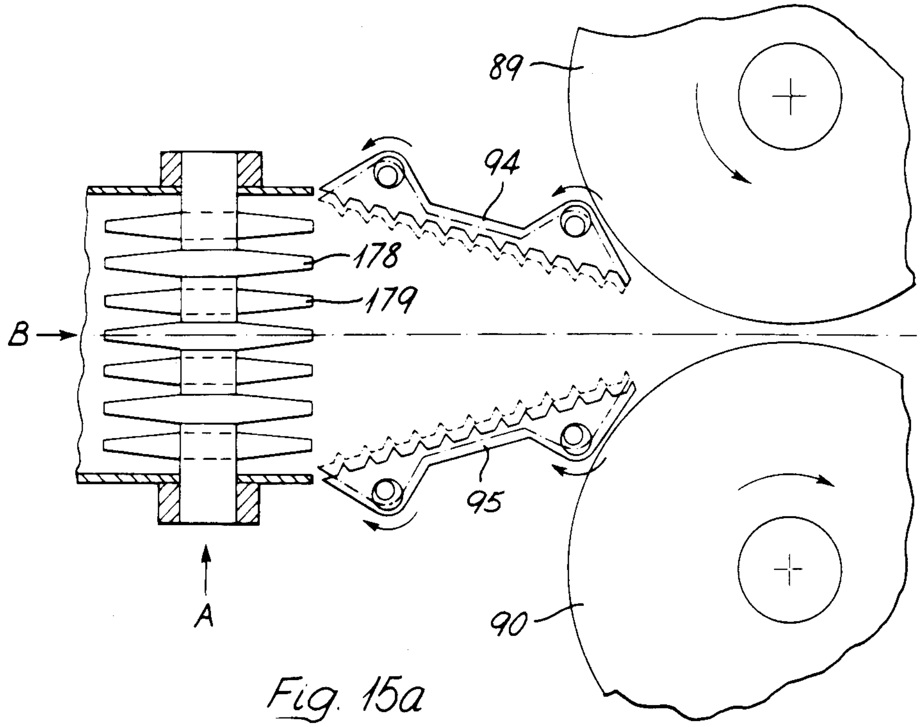
FIG. 15(*a*) is a plan or side view of yet another alternative form of material-orientating device and FIGS. 15(*b*) and 15(*c*) are views taken in the direction of arrows *A* and *B* respectively in FIG. 15(*a*).
Figure 15B:
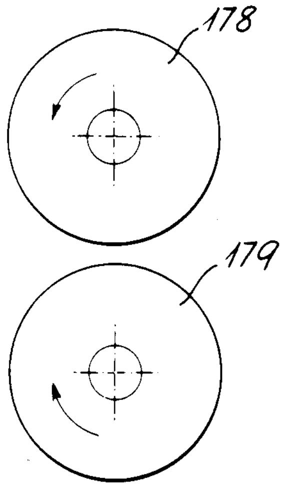
Figure 15C:
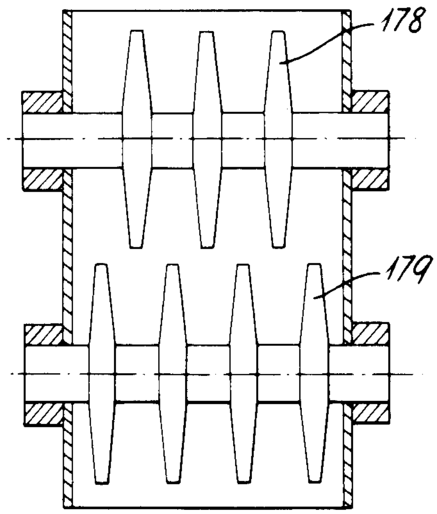

FIG. 15(*a*) shows an alternative arrangement for 'crimping' the crop column after formation by the primary compaction mechanism. The profiled rollers 178,179 may be undriven or driven and located as shown at 102 and 103 in FIG. 12(*a*) at a variable centre distance.

It should be noted that the protrusions shown in FIGS. 14(*a*) and 14(*b*) may be sharpened at their leading edges, to achieve severing of crop during compression, at least in part of each charge. Similarly, if the profiled rollers shown in FIG. 15(*a*) were replaced by cylindrical spaces between sharpened discs, a cutting effect could also be achieved.

FIG. 15(*b*) is a view in direction of arrow A in FIG. 15(*a*) and FIG. 15(*c*) a view in the direction of arrow B. Although the profiled rollers are shown mounted in fixed positions, their centre distance can be made adjustable, as mentioned earlier, or one roller may be arranged to be spring-loaded towards a limit stop in the direction of the other roller.

Figure 16A:
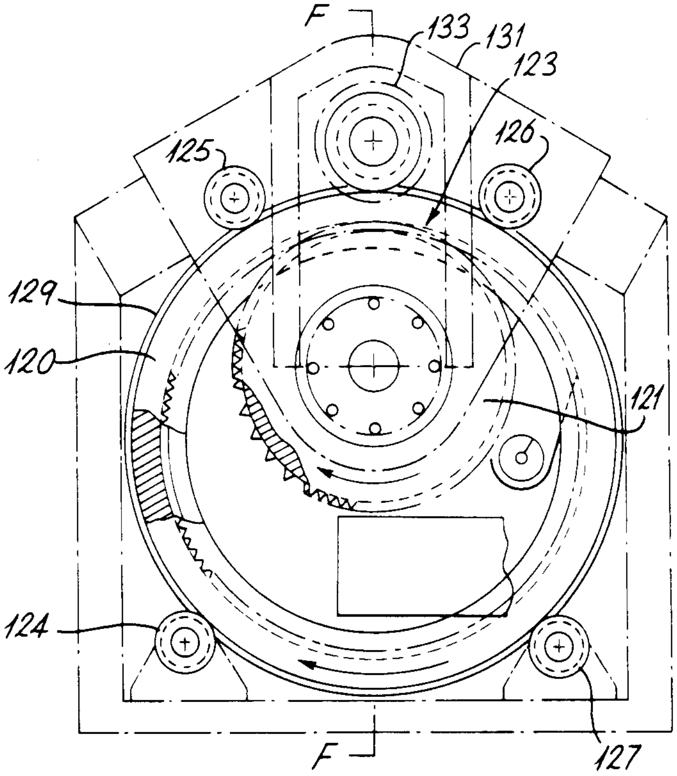
FIG. 16(*a*) is a plan or side view, partly in section of a ninth form of briquetting machine in accordance with the present invention.
Figure 16B:
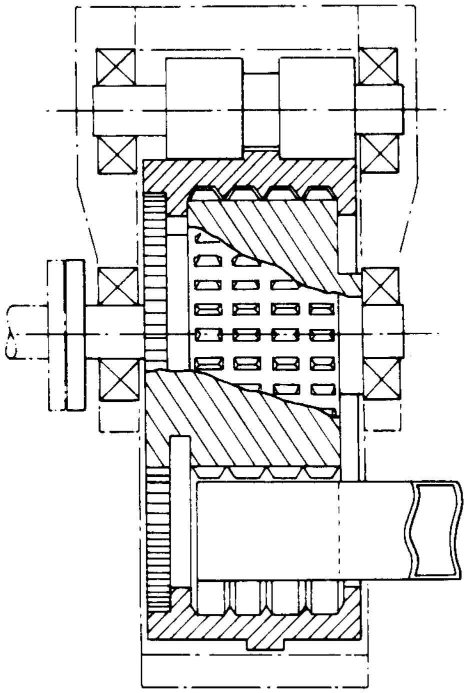

Turning now to FIGS. 16(*a*) and 16(*b*), these show an alternative form of briquetting press, comprising essentially a large-diameter ring 120 and a smaller diameter roller 121 so placed inside the ring that the two components co-operate closely at the "12 o'clock" position 123. Jointly the ring and roller form a gradually converging, curved intake and pre-compaction region for crop entering at an angle as a pre-formed column beneath the roller.

The ring 120 is supported on trunnion rollers 124–127 which have recesses to engage with a central rib 129 on the outer surfaces of the ring. In this way radial and axial support is provided.

The roller 121 is supported in a heavy suspended saddle 131 which also carries a substantial backing roller 133 to support the main compressive load. The press roller is driven through reduction gears and is then geared to the ring at the required speed ratio, as illustrated, for example, in FIG. 16(*b*).

Briquette length- and width-defining protrusions, and any elements designed to give an additional indenting effect, may be fitted to the co-operating surfaces of the press roller and ring in the combinations described previously in the context of the roller press configurations. If only the briquette width-defining circumferential ribs are fitted to one of the rotary components, it becomes possible to drive the ring and roller separately and, if desired, at differential speed.

To ensure clean feeding into, and the retention of the material in, the compression region, an annular plate is attached to both sides of the ring 120. Briquettes made in the machine may be dislodged, if necessary, by optional scrapers and extracted from the press by means of a chute or the auger shown in FIG. 16(*a*). A variation on the ring and roller press is possible by replacing the roller with a ring of similar diameter.

Referring now to FIG. 17(*a*), this shows in plan view a pick-up baler 135 for collecting crop from the field comprising a pick-up device and a longitudinally reciprocating piston 37 for compacting the crop and force-feeding it through a converging duct 139 into the nip of a roller press 141. The press is designed as a trailed attachment of the baler and the common axis of the press roller centre lies at right angles to the crop flow. In an alternative embodiment (not shown) it may instead be designed to lie angularly displaced horizontally and/or vertically relative to the direction of crop flow.

Many drive arrangements are possible. That shown is by low-speed hydraulic motors 143,144 directly on to each roller, the hydraulic pump and oil reservoir being positioned alongside the baler plunger. At the rear of the press rollers two driven rotary brushes 148,149 are provided, to clean the roller surfaces and dislodge any adhering wafers. All the briquettes made fall into a collecting hopper, from which they may be conveyed away by an auger 151, for example into a trailer or pallet box (not shown).

FIG. 17(*b*) is a sectioned view in the direction of arrows GG in FIG. 17(*a*) of the baler and trailed press. Although the baler is conventional in overall design, the height of the piston has been reduced to 250 mm. Absence of a knotting mechanism allows piston speed to be approximately doubled, relative to a conventional baler, and this permits normal throughput levels to be at least maintained. The operative height of the briquetting press rollers and the crop column guide plates relates to that of the baler piston. To achieve good feeding of the crop column into the nip of the briquetting roller, the normal length of the bale chamber has been drastically shortened and the horizontal clearance between the downstream ends of the crop column guide plates is kept to around 300 mm.

I claim:

1. For forming fibrous crop or like materials into self-supporting products, an apparatus comprising:
   - first and second rotary compression members arranged so that opposed annular closing faces of the compression members cooperate to define the principal pressure-generating surfaces of a compression space for a charge of the materials;
   - a plurality of axially-aligned longitudinal rib protrusions extending radially from the closing face of a first one of said compression members to abut the closing face of the second one of said compression members and to define axially parallel first walls of the compression space;
   - a plurality of axially-spaced circumferential rib protrusions extending radially from the other of said opposed closing faces to abut the closing face of said first compression member and to define axially transverse second walls of the compression space;
   - at least some respective rib protrusions of one of said plurality of axially-aligned longitudinal rib protrusions and said plurality of axially-spaced circumferential rib protrusions being interrupted at corresponding sites along the length thereof to provide a plurality of rows of gaps, and respective rib protrusions of the other of said plurality of axially-spaced circumferential rib protrusions and axially-aligned longitudinal rib protrusions extending through respective ones of said rows of gaps;
   - generally tapering projections extending into the space bounded by said longitudinal and circumferential rib protrusions, but to a lesser extent that said protrusions; and
   - drive means operative to rotate the two compression members in opposite rotational senses to one another;
   - said longitudinal and circumferential rib protrusions being tapered towards their radially outer edges so as, in operation of the apparatus, to combine with said closing faces of the compression members and with said generally tapering projections to apply pressure having components in three mutually orthogonal directions at and within the perimeter of the charge, thereby to produce in the charge zones of relatively high bond strength which limit subsequent relaxation of the charge to maintain a relatively high charge density.

2. An apparatus as claimed in claim 1 in which the compression space is provided by a pocket, die chamber, or cell, defined by said opposed faces and by said opposed walls which take the form of product width- and length-determining rib-like protrusions extending from one or both of these faces.

3. An apparatus as claimed in claim 1 including one or more projections extending from one or both of the opposed faces of the compression members into the space bounded, or in part bounded, by the wall-providing protrusions.

4. An apparatus as claimed in claim 1 in which the compression members comprise two co-operating compression rotors.

5. An apparatus as claimed in claim 4 in which the two rotors take the form of two rollers.

6. An apparatus as claimed in claim 4 in which the two rotors take the form of a roller and a ring.

7. An apparatus as claimed in claim 4 in which the two rotors take the form of two rings.

8. An apparatus as claimed in claim 4 comprising a mobile briquetting press with integral facilities for collecting crop from the ground and forming it into a pre-compacted column for feeding into the nip of the compression rotors.

9. An apparatus as claimed in claim 8 in which a pre-compaction device is provided upstream of the crop-briquetting press.

10. An apparatus as claimed in claim 9 in which feed means are provided for modifying the dimensions of a crop column emanating from the pre-compaction device to make the column dimensionally compatible with the briquetting press and provide or augment the force necessary to feed the material into the press.

11. An apparatus as claimed in claim 4 in which incomplete separation of the products by the compression members is prevented by means operable to pre-cut material before it is compressed to maximum density.

12. An apparatus as claimed in claim 4 in which one or more protrusions are provided on both rotors and means are provided to ensure that the rotors rotate in synchronism.

13. An apparatus as claimed in claim 4 in which the transverse length-defining rotor protrusions are ribs of semi-circular, parabolic or arcuate cross-section.

14. An apparatus as claimed in claim 4 in which the rotor protrusions include an intermediate rib of semi-circular, parabolic or arcuate cross-section operative to form a full-width central briquette indentation.

* * * * *